(12) United States Patent
Perreault

(10) Patent No.: US 7,710,633 B2
(45) Date of Patent: May 4, 2010

(54) OPTICAL SCANNING AND IMAGING APPLICATIONS USING DEFORMABLE MIRRORS

(75) Inventor: Daniel C. Perreault, Everett, WA (US)

(73) Assignee: Intermec IP Corp., Everett, WA (US)

( * ) Notice: Subject to any disclaimer, the term of this patent is extended or adjusted under 35 U.S.C. 154(b) by 48 days.

(21) Appl. No.: 12/056,517

(22) Filed: Mar. 27, 2008

(65) Prior Publication Data

US 2009/0244687 A1 Oct. 1, 2009

(51) Int. Cl.
G02B 26/00 (2006.01)
G02B 26/08 (2006.01)

(52) U.S. Cl. ...................... 359/290; 359/198.1

(58) Field of Classification Search .................. 359/198, 359/224, 290–292, 298, 318, 846
See application file for complete search history.

(56) References Cited

U.S. PATENT DOCUMENTS

| | | | |
|---|---|---|---|
| 2004/0140737 A1* | 7/2004 | Barillot et al. | 310/328 |
| 2006/0028703 A1* | 2/2006 | Govil et al. | 359/224 |
| 2006/0262414 A1* | 11/2006 | Goto | 359/629 |
| 2008/0117489 A1* | 5/2008 | Tanaka et al. | 359/224 |

* cited by examiner

*Primary Examiner*—William C Choi
(74) *Attorney, Agent, or Firm*—Perkins Coie LLP

(57) ABSTRACT

A deformable mirror changes configuration in response to a change of the configuration of a shape memory material. In some examples, the deformable mirror is formed of the shape memory material. In other examples, the deformable mirror changes configuration under the control of actuators comprising shape memory materials.

23 Claims, 14 Drawing Sheets

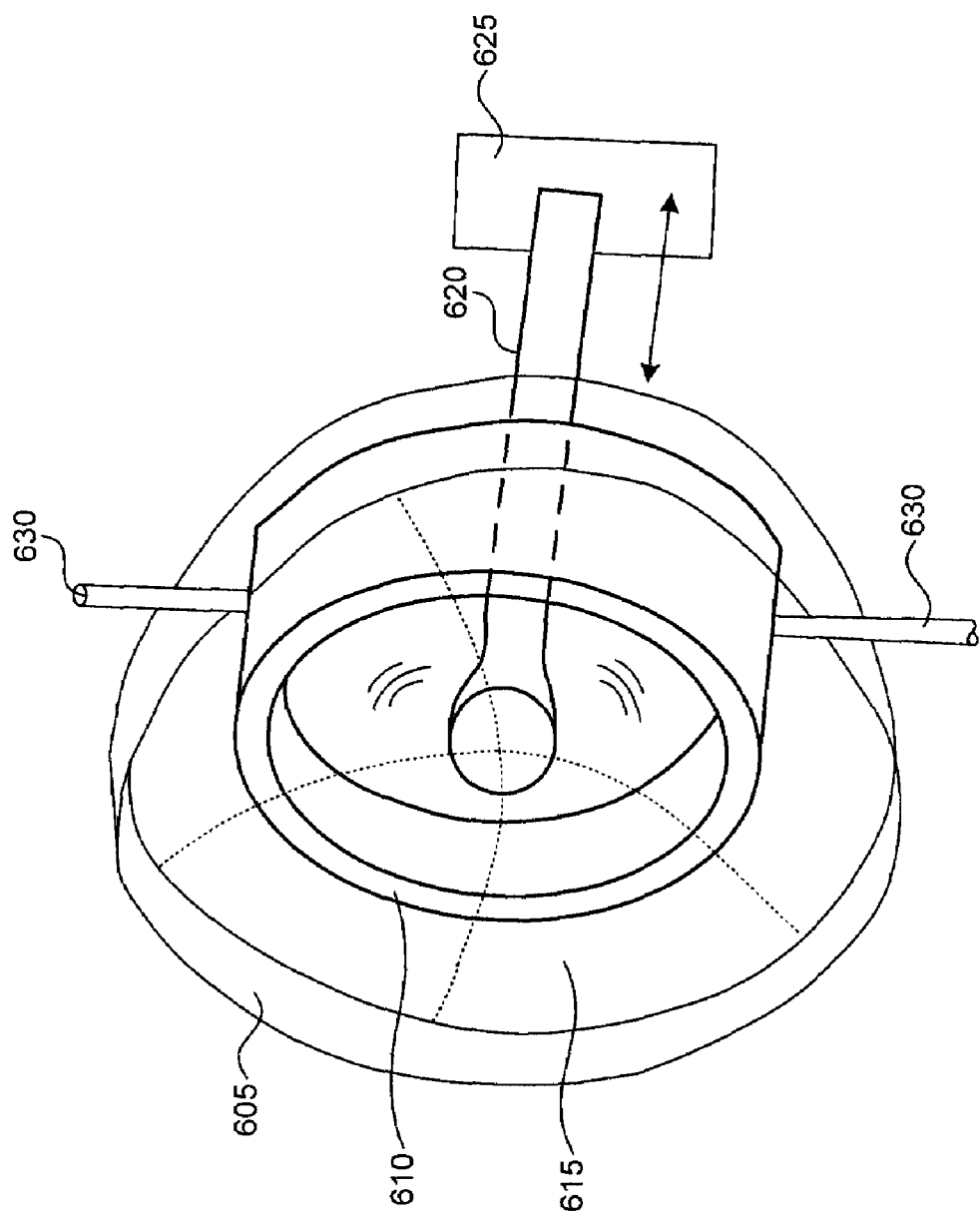

OPTICAL SCANNING AND IMAGING APPLICATIONS USING DEFORMABLE MIRRORS

BACKGROUND

Optical scanning and imaging applications often use mirrors to control the focus, trajectory, and shape of reflected light. For instance, bar code scanners commonly use mirrors to focus a laser beam on a bar code and to move (i.e., scan) the laser beam back and forth across the bar code. Similarly, imagers such as optical scanners and photocopiers commonly use mirrors to focus light on objects being imaged and to control a scanning path of the focused light along these objects.

In many optical scanning and imaging applications, light is generated by a collimated light source such as a laser. A collimated light source generates a column of light (also called a "collimated beam") where each ray of light has a trajectory that substantially parallels the trajectories of other rays of light in the column. In practice, light diffraction makes it difficult to create a perfectly collimated beam, i.e., a beam where each ray of light exactly parallels every other ray of light. Accordingly, the light diffraction in a collimated beam creates a need for mirrors to shape, focus, and steer collimated beams in various optical scanning and imaging applications.

As an example, when a bar code scanner directs a laser beam at a bar code, diffraction may cause the laser beam to appear on the bar code as a larger or smaller laser spot depending on the distance between the bar code scanner and the bar code. If the laser spot on the bar code is larger than the bars of the bar code, the bar code reader may be unable to properly read the bar code. Accordingly, the bar code scanners may be designed to focus light at a small point within a fixed distance of the scanner for a given sized bar code; however, outside the range, the scanner may be unreliable.

Different types of mirrors can be used to manipulate light in different ways. As examples, a parabolic mirror can be used to focus light into a small spot, or cylindrical mirror can be used to create an elongated light beam from a reflected beam. These and other types of mirrors can manipulate light in the form of beams and other forms. Similarly, various techniques can be used to steer light in different directions. For instance, bar code scanners often use oscillating mirrors to move light back and forth and telescopes and microscopes commonly use movable mirrors to vary the magnification of objects being viewed.

Most conventional mirrors for manipulating light have only one configuration, and therefore they generally are only able to focus, steer, or shape light in one particular way. For instance, most parabolic mirrors only provide one level of focus and most cylindrical mirrors provide a single type of reshaping. However, in some applications, it may be advantageous to use mirrors capable of performing different types of manipulations. Among these applications, there are size-limited or cost limited components that need to perform multiple light manipulations, but would be too large or expensive if implemented with multiple mirror components.

In order to vary the way in which light is manipulated by a single mirror, researchers have developed techniques whereby a single deformable mirror performs multiple different types of light manipulations based on its configuration. For the most part, these conventional deformable mirrors change configuration under the control of mechanical components. For instance, some applications have used micro-electro-mechanical systems (MeMs) to control mirror deformations.

Unfortunately, these mechanical components tend to be somewhat unreliable and costly. Additionally, the operation of these components typically consumes a significant amount of power, requires complex control mechanisms, and provides inaccurate movements. Accordingly, their utility can be limited by these and other factors.

In view of the above shortcomings, a need exists for improved techniques and technologies for performing mirror deformations in a variety of different applications. The above examples of prior systems and their associated limitations are intended to be illustrative and not exclusive. Other limitations of existing or prior systems will become apparent to those of skill in the art upon reading the following.

BRIEF DESCRIPTION OF THE DRAWINGS

FIGS. 6A and 6B illustrate a deformable mirror controlled by an extendable rod.

DETAILED DESCRIPTION

Figure 1:
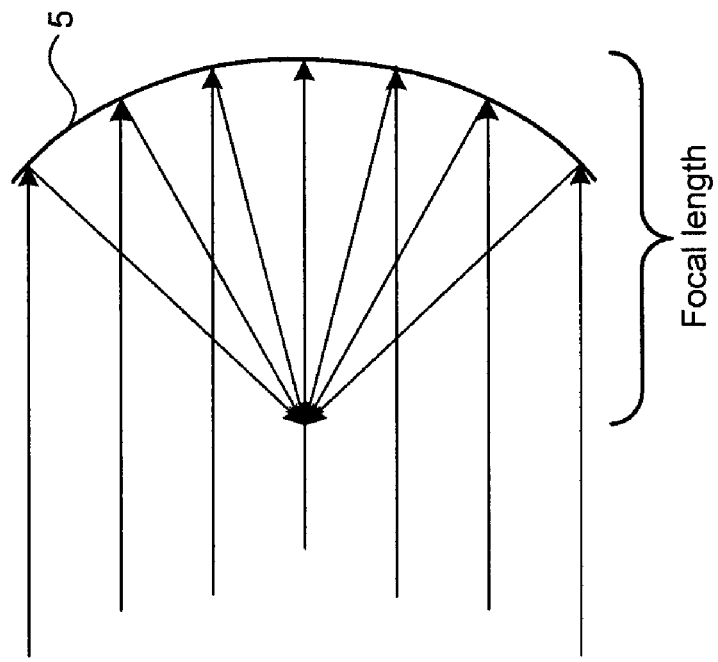
FIG. 1 illustrates a deformable mirror in two different configurations having different focal lengths.
Figure 1:
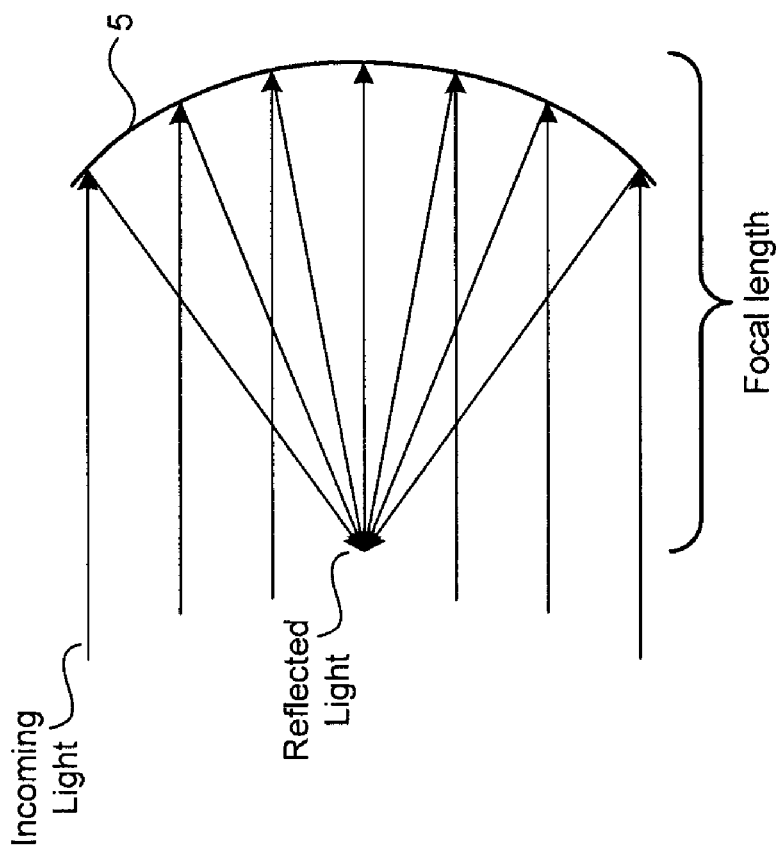

Various examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

Examples of the invention include systems and methods in which deformable mirrors are controlled to manipulate various characteristics of reflected light. In some examples, a deformable mirror is controlled to modify its focal length, and in some examples, a deformable mirror is controlled to deflect a trajectory of reflected light. In each of the disclosed examples, a deformable mirror is controlled by changing the configuration of a shape memory material, as described in further detail below.

Many of the disclosed systems and methods find ready application in optical instruments such as bar code readers, optical scanners, microscopes, laser range scanners, telescopes, cameras, compact disk or digital video disk players and projectors to name but a few. Selected examples of the invention may enhance the performance of these instruments in a variety of ways. For instance, some examples may reduce the amount of power required to focus and deflect light; some examples may simplify the control mechanisms required to focus and deflect light; and some examples may increase the speed, accuracy, and reliability with which light is focused and deflected.

As used in this disclosure, the term "shape memory material" denotes any of several materials exhibiting two or more stable, solid form configurations defined in relation to martensitic transformations of the materials. Examples of shape memory materials include shape memory alloys such as nickel-titanium (Ni—Ti), gold-cadmium (Au—Cd), copper-zinc-aluminum-nickel (Cu-Zi-Al—Ni), and copper-aluminum-nickel (Cu—Al—Ni), and shape memory ceramics such as lead zirconate ($PbZrO_3$), lead titanate ($PbZrO_3$), and lead zirconate titanate (PZT). A variety of shape memory materials and their properties are described in detail in a book entitled "Shape Memory Materials", Cambridge University Press, 1998, Edited by K. Otsuka, and C. M. Wayman (hereafter, "Otsuka"). The book also describes various techniques for forming the shape memory materials in different shapes.

A shape memory material changes configuration by realigning its crystalline structure into a different pattern. Typically, each pattern defines a different shape of the material, and therefore a shape memory material can be cycled between different shapes by changing the pattern of its crystalline structure. In a shape memory alloy, the crystalline structure can be changed by controlling the alloy's temperature or by applying physical stress to the alloy. On the other hand, in a shape memory ceramic, the crystalline structure can be changed by applying an electrical field to the ceramic.

The different configurations of a shape memory material can be initially established through a "training" process designed to teach the material to "remember" different configurations. In one example, this training process involves placing the material in desired shapes while at extreme temperatures to establish the different configurations. A variety of such training processes are disclosed in detail in Otsuka, and still other training processes are known in the art.

Shape memory alloys and shape memory ceramics each have various advantages and drawbacks compared with the other. For instance, shape memory alloys tend to be more flexible and exhibit larger changes of shape compared with shape memory ceramics. However, shape memory alloys generally exhibit greater hysteresis and change shape more slowly compared with shape memory ceramics. Additionally, shape memory alloys typically require sustained input energy to maintain particular configurations due to their sensitivity to changes in temperature and physical stress, while shape memory ceramics do not require sustained input energy, since different configurations can be maintained without continued application of an electrical field.

Shape memory alloys and shape memory ceramics can both be controlled to change shape using electricity. In particular, a shape memory alloy can be heated to change its shape by passing an electrical current through the alloy. Likewise, a shape memory ceramic can be controlled to change its shape by passing an electrical current through the ceramic. On the other hand, shape memory alloys can also be controlled to change shape using non-electrical heating and/or cooling techniques.

To illustrate the control of shape memory alloys and ceramics, some of the drawings show a simple electrical control system modeled as a current source connected in parallel with one or more resistors. The current source generates a current through the shape memory material, which heats up a shape memory alloy to change its shape, or generates an electrical field for a shape memory ceramic to change its shape. While some of the drawings in this disclosure do not show this simple electrical control system, each of the illustrated optical systems could use a similar electrical control system or any of several alternatives.

Although the drawings illustrate a relatively simple electrical control system, it should be recognized that a variety of different electrical control systems could be used to change the shape of the illustrated shape memory materials. In addition, it should be recognized that shape memory alloys can be heated and cooled by means other than electricity. However, because the emphasis of this disclosure is not on control systems, a detailed presentation of alternative control systems will be omitted for brevity and simplicity of explanation.

In any of the disclosed examples, features formed by shape memory materials may comprise a shape memory alloy or a shape memory ceramic. These features may be formed entirely of a single shape memory alloy or ceramic, or they may include additional elements or features. For instance, these features may be formed by combining a shape memory ceramic with a flexible material in a layered structure to increase the amount of deformation that can be achieved by the shape memory ceramic.

The layered structure, also referred to as a bi-morph structure or a stacked structure, typically comprises thin layers of shape memory ceramic interspersed with layers of a flexible material such as a plastic polymer. The thin layers of shape memory ceramic are generally less brittle than thicker layers of shape memory ceramic, and therefore the layered structure can move in a more dynamic way compared with a thicker, non-layered shape memory ceramic. As another alternative, a shape memory material could be formed in a mesh or other configuration, either with or without additional elements such as stacked layers. Some examples of different structures for shape memory materials are disclosed in related and commonly assigned U.S. patent application Ser. Nos. 12/019,480 and 11/968,404, which are incorporated by reference.

In some of the disclosed examples, deformable mirrors may be formed by polishing a shape memory material or by applying a reflective coating to a shape memory material. In other examples, deformable mirrors may be formed of flexible materials that do not include shape memory materials, but are flexed under the control of shape memory materials.

While the disclosed examples show deformable mirrors with specific shapes, these examples could be modified to use mirrors with a variety of other different shapes. As examples, some alternative shapes include a variety of parabolic shapes, spherical shapes, cylinder shapes, rectilinear shapes, and so on.

FIG. 1 illustrates a simple deformable mirror 5 with a variable focal length. On the left side of FIG. 1, deformable mirror 5 is shown in a first configuration where it has a relatively long focal length, and on the right side of FIG. 1, deformable mirror 5 is shown in a second configuration with a relatively short focal length. As seen in FIG. 1, the focal length of deformable mirror 5 can be increased or decreased by modifying its curvature.

Figure 2:
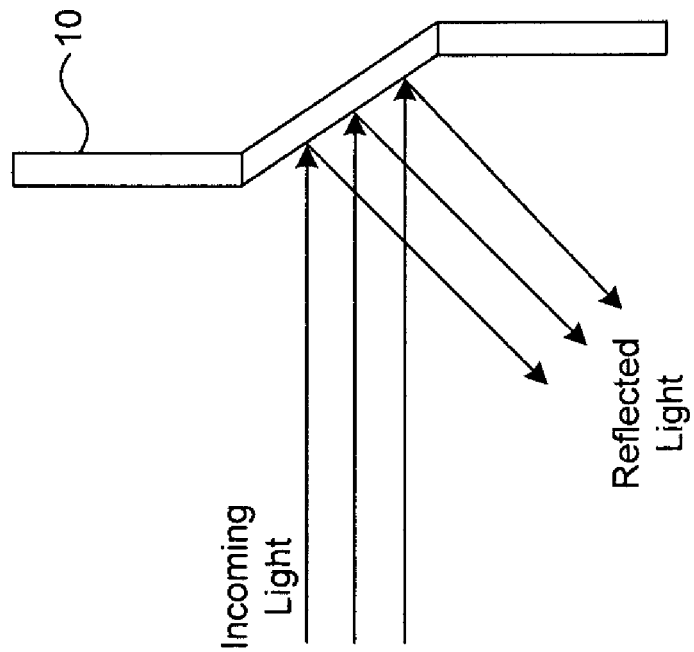
FIG. 2 illustrates a deformable mirror in two different configurations that reflect light in different directions.
Figure 2:
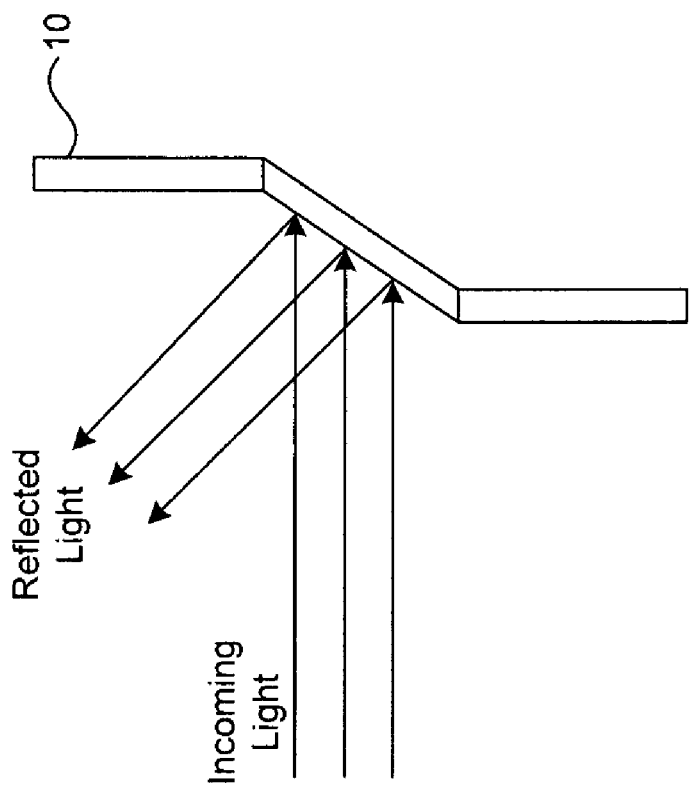

FIG. 2 illustrates a simple deformable mirror 10 capable of deflecting light in different directions. On the left side of FIG. 2, deformable mirror 10 is shown in a first configuration where it deflects light in an upward direction, and on the right side of FIG. 2, deformable mirror 10 is shown in a second configuration where it deflects light in a downward direction. While deformable mirror 10 is shown with three flat portions, a similar result could be obtained using a curved mirror. Additionally, although not shown, when deformable mirror 10 transitions between the first and second configurations, reflected light passes along a trajectory between the upward direction and the downward direction. The movement along this trajectory can be used for applications such as bar code scanning.

In general, the deformable mirrors shown in FIGS. 1 and 2 could be formed of or controlled by shape memory materials. Where the deformable mirrors are formed of or controlled by shape memory materials, the mirrors can generally be controlled by applying thermal or electromagnetic energy to the shape memory materials. While FIGS. 1 and 2 show relatively simple deformable mirrors, FIGS. 3 through 9 present several additional, perhaps more complex deformable mirrors. All of the deformable mirrors presented in this disclosure are deformed by controlling the respective configurations of different shape memory materials.

Figure 3A:
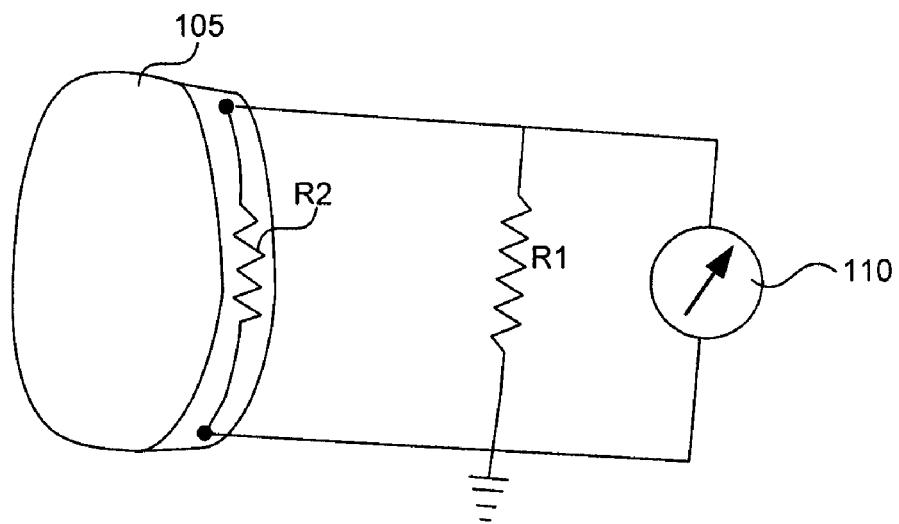
FIGS. 3A and 3B illustrate a deformable mirror having a variable focal length.
Figure 3B:
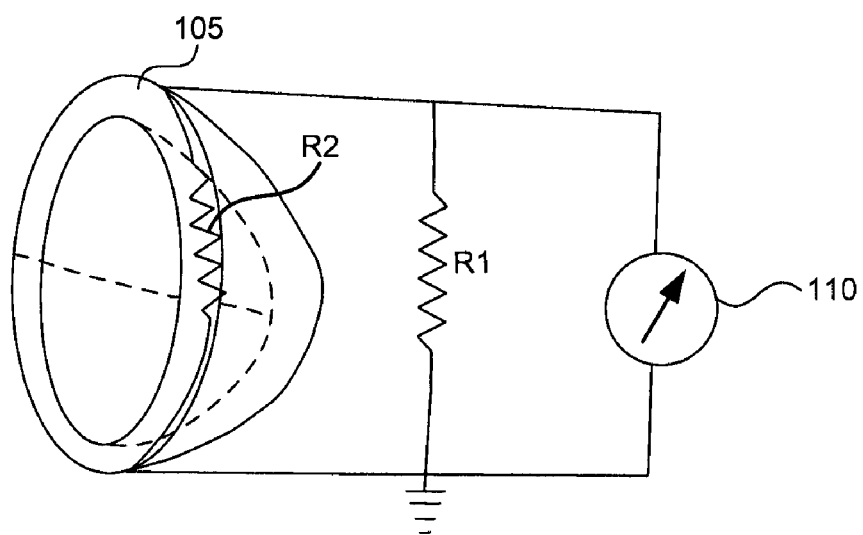

FIGS. 3A and 3B illustrate a deformable mirror 105 controlled by a current source 110. Deformable mirror 105 comprises a shape memory material having a first stable configuration shown in FIG. 3A and a second stable configuration shown in FIG. 3B.

Current source 110 is connected in parallel with deformable mirror 105 and a resistance R1. Accordingly, the amount of current that passes through deformable mirror 105 is determined by the magnitude of a current generated by current source 110, the value of resistance R1, and the amount of resistance in deformable mirror 105. The resistance in deformable mirror 105 is illustrated as a resistance R2. In general, this resistance is determined by the characteristics of the shape memory material. As an example, shape memory metals tend to be good conductors, and therefore they tend to have relatively low resistance. Where resistance R1 is relatively large compared with resistance R2, a relatively small current passes through deformable mirror 105. On the other hand, where resistance R1 is relatively small compared with resistance R2, a relatively large current flows through deformable mirror 105.

Although not shown, the flow of current from current source 110 to deformable mirror 105 can be controlled by turning current source 110 on and off or by opening and closing an electrical switch connected along a current path between current source 110 and deformable mirror 105. Accordingly, the current flow can be controlled to change deformable mirror 105 between the first and second configurations.

Figure 4A:
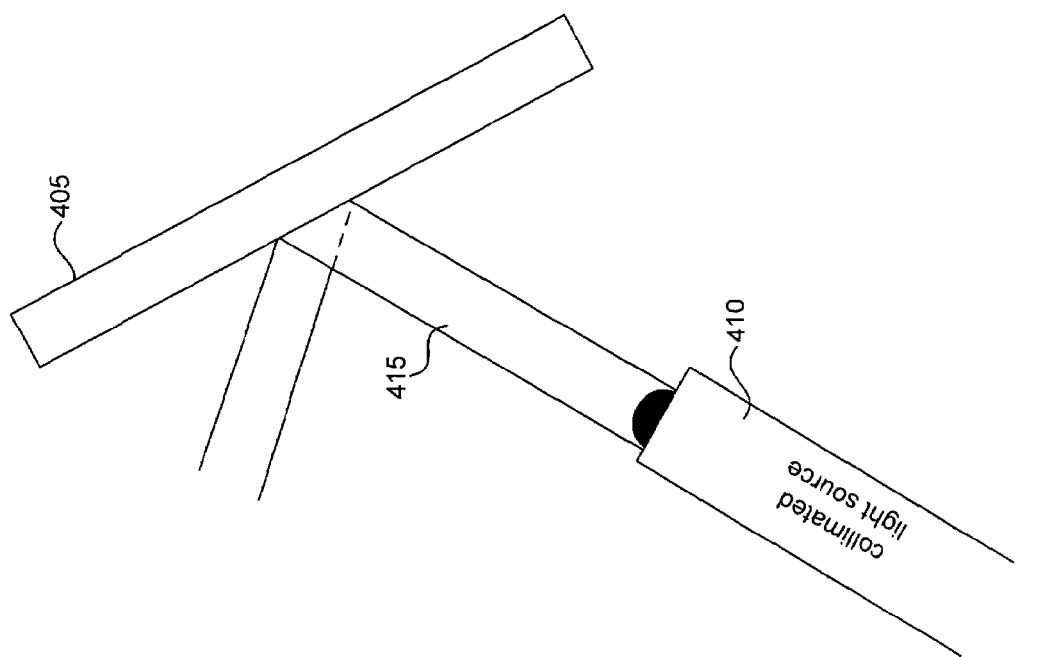
FIGS. 4A and 4B illustrate a deformable mirror capable of changing the direction of reflected light based on the mirror's deformation.
Figure 4B:
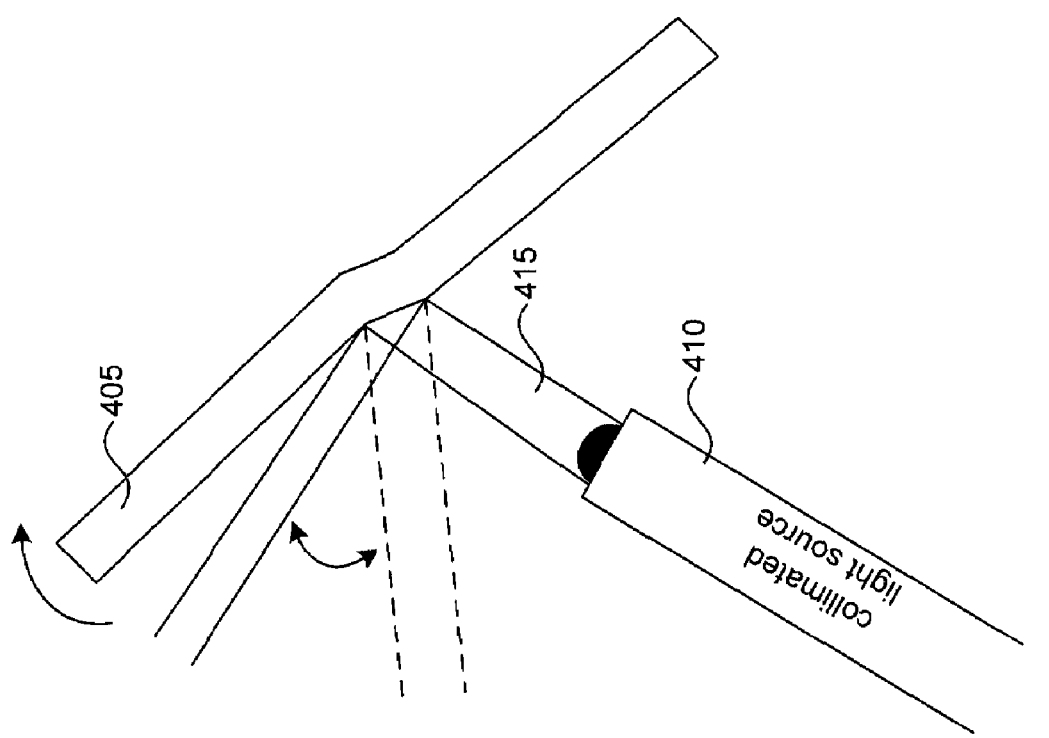

FIGS. 4A and 4B illustrate a deformable mirror 405 capable of changing the direction of reflected light based on the mirror's deformation. Deformable mirror 405 comprises a shape memory material having a first stable configuration shown in FIG. 4A and a second stable configuration shown in FIG. 4B. As illustrated by a one-ended arrow in FIG. 4B, the second configuration is obtained by moving an upper portion of deformable mirror 405 relative to a lower portion of deformable mirror 405, as illustrated by a one-ended arrow in FIG. 4B.

FIGS. 4A and 4B also show a collimated light source 410 projecting a collimated beam 415 onto deformable mirror 405. When deformable mirror 405 is in the first configuration, it deflects or reflects collimated beam 415 in a first direction illustrated by open-ended solid lines in FIG. 4A and illustrated by open-ended dotted lines in FIG. 4B. When deformable mirror 405 is in the second configuration, it deflects or reflects collimated beam in a second direction illustrated by open-ended solid lines in FIG. 4B. By controlling deformable mirror 405 to transition between the first and second configurations, the beam and mirror system of FIGS. 4A and 4B moves collimated beam 415 across a path shown by a two-ended arrow in FIG. 4B. This movement can be used for scanning applications such as bar code scanning.

Although not shown in FIGS. 4A and 4B, deformable mirror 405 can be controlled to change configurations by the application of thermal or electrical energy. These control mechanisms can take a variety of different known forms such as different circuits or thermal conduction systems. However, for brevity and simplicity of explanation, a detailed description of these known forms is omitted.

Figure 5A:
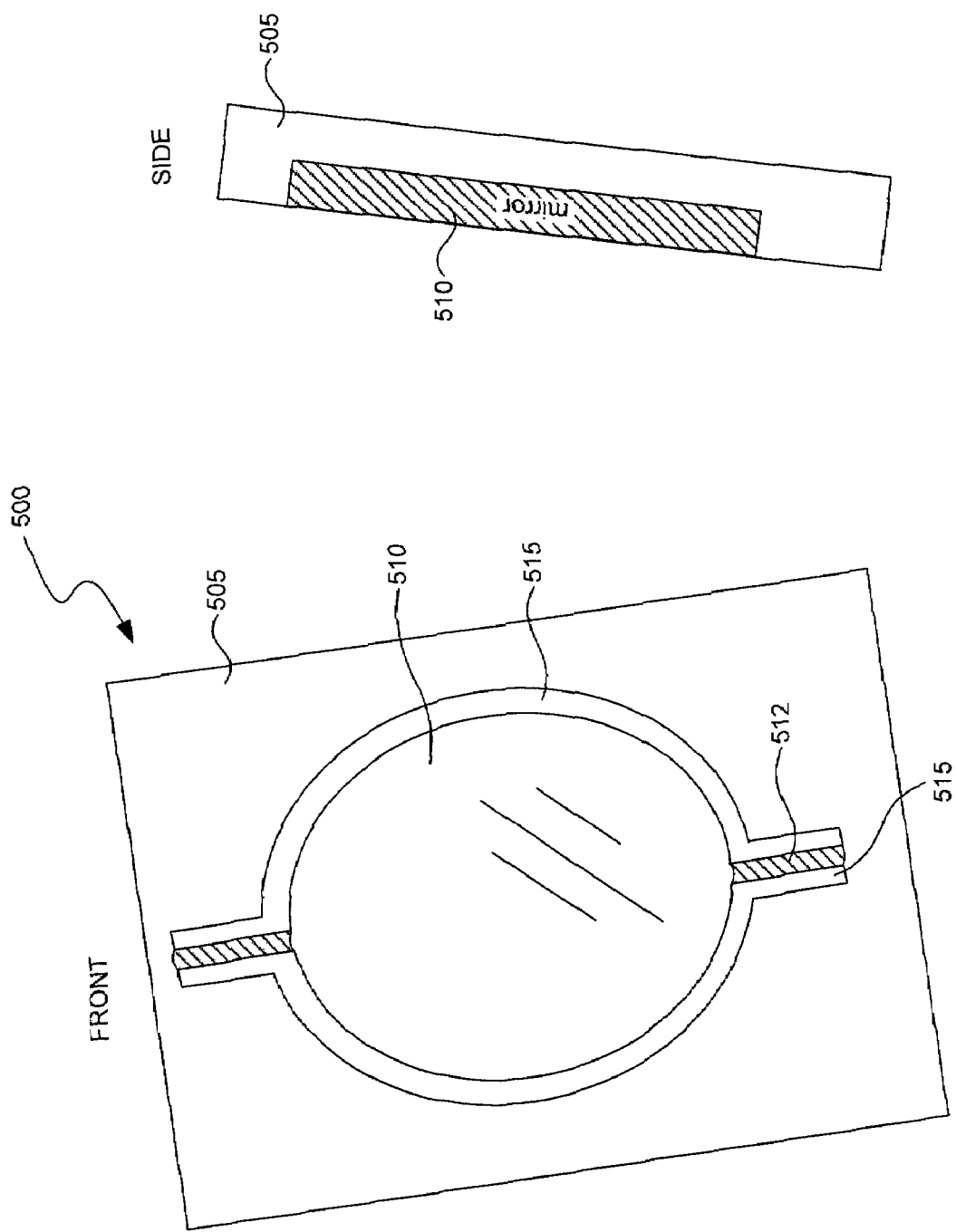
FIGS. 5A and 5B illustrate a deformable mirror formed in a ceramic substrate.
Figure 5B:
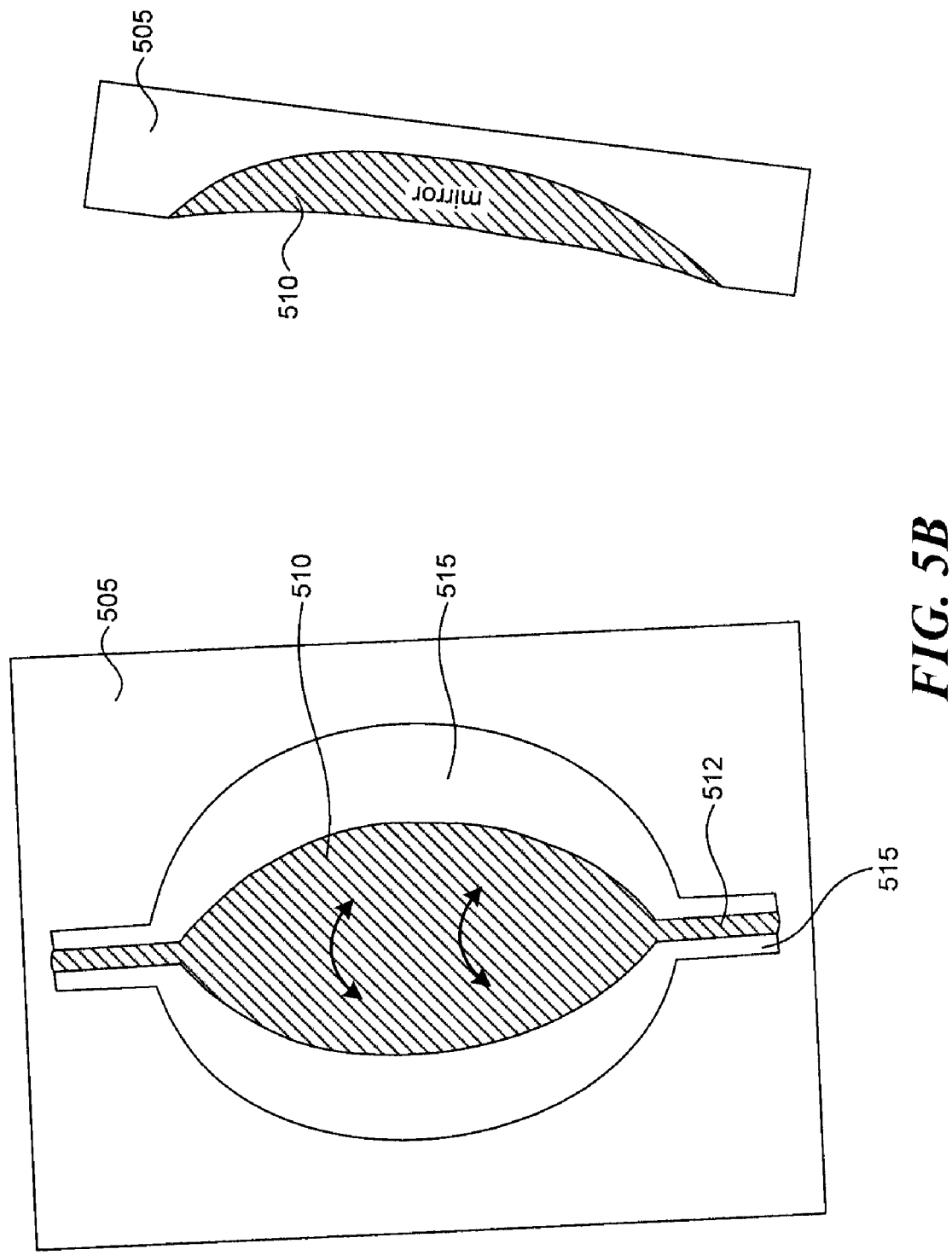

FIGS. 5A and 5B illustrate a deformable mirror system 500 comprising a deformable mirror 510 suspended in a central portion of a body 505. Deformable mirror 510 comprises a shape memory material having a first stable configuration shown in FIG. 5A and a second stable configuration shown in FIG. 5B. As with other examples in this detailed description, deformable mirror 510 can be controlled to change configurations by applying electromagnetic or thermal energy thereto using any of several available techniques.

Deformable mirror 510 is suspended in body 505 by rod-like portions 512. Deformable mirror 510 and rod-like portions 512 are separated from body 505 by voids 515. Cross-sectional views on the right side of FIGS. 5A and 5B show the depth of deformable mirror 510 within body 505. Voids 515 extend all the way through body 505 so that deformable mirror 510 can move in free space.

In one example, system 500 is formed by placing a layer of shape memory ceramic over a semiconductor substrate to form body 505 with two layers, etching the shape memory ceramic and the semiconductor substrate around the central portion of body 505 to create voids 515, and then removing the semiconductor substrate from the central portion of body 505 to create voids 515. Upon completing this process, deformable mirror 510 remains in the central portion of body 505, being composed of a freestanding portion of the shape memory ceramic layer. Where system 500 is formed using this process, a reflective surface can be formed on deformable mirror 510 by sputtering a reflective material onto a surface of the shape memory ceramic, or by polishing the surface of the shape memory ceramic. The reflective surface can generally be formed either before or after formation of voids 515.

In the first configuration shown in FIG. 5A, deformable mirror 510 is substantially flat. In contrast, in the second configuration shown in FIG. 5B, deformable mirror 510 has a curved (e.g., parabolic, hyperbolic, or spherical curve) shape. As illustrated by the side view in FIG. 5B, the curved shape concaves inward from the surface of substrate 505. However, in alternative examples, the curved shape could form a convex shape relative to the surface of substrate 505. Additionally, in other alternative examples, deformable mirror 510 move in other ways such as rotating about the axes of rod-like portions 512.

In examples where deformable mirror 510 rotates about the axes of rod-like portions 512, rod-like portions 512 may be formed of one or more shape memory materials that deform between two configurations such that deformable mirror 510 rotates or oscillates from side to side. Such rotation or oscillation could be used, for example, to deflect light back and forth in an optical scanning application.

In still other examples, deformable mirror 510 and/or rod-like portions 512 could be formed of two layers of shape memory material bonded together. One of the two layers could be used to provide one type of deformation for deformable mirror 510, and the other of the two layers could be used to provide another type of deformation for deformable mirror 510. For instance, one layer could be used to rotate deformable mirror 510 from side to side (e.g., by deforming rod-like portions 512), and the other layer could be used to modify the curvature of deformable mirror 510.

By deforming in one or more of these different ways, deformable mirror 510 can control light in a variety of ways, e.g., by changing its focal length to focus light or by changing its angular reflection to deflect light in different directions. As suggested above, such deformations can be useful in a variety of different optical applications and instruments, such as bar code scanners, lasers, and so on.

Figure 6A:
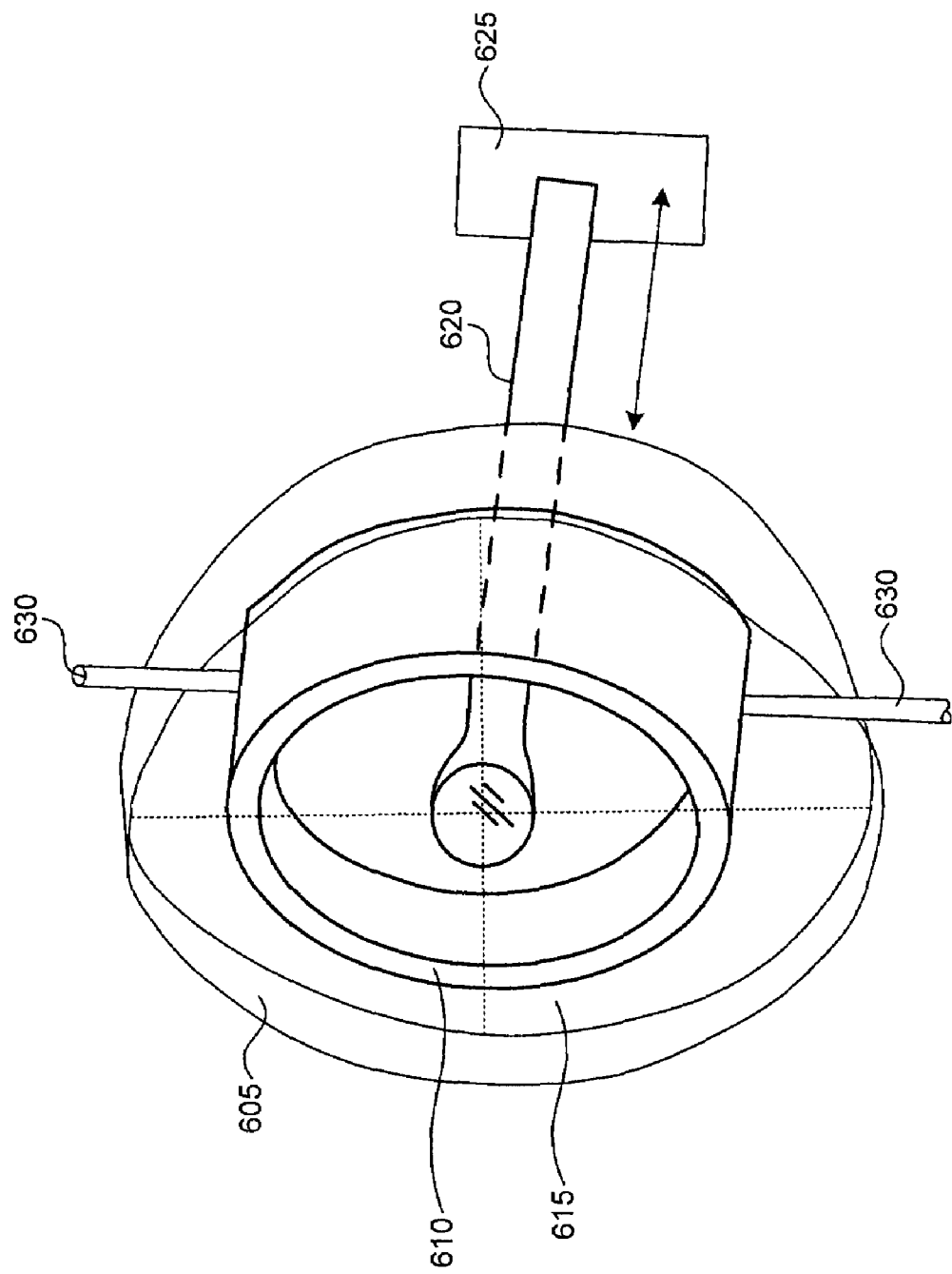

FIGS. 6A and 6B illustrate an apparatus comprising a deformable mirror 605 that changes configuration in response to deformations of an extendable rod 620. In selected variations of the illustrated apparatus, shape memory materials can be used to form any of extendable rod 620, deformable mirror 605, or one or more actuators associated with extendable rod 620 or deformable mirror 605.

In addition to deformable mirror 605 and extendable rod 620, the apparatus of FIGS. 6A and 6B further comprises a retaining ring 610 attached to a back surface 615 of deformable mirror 605, a pivot rod 630 supporting retaining ring 610, and a rod mount 625 supporting extendable rod 620. Extendable rod 620 is attached at one end to rod mount 625, and at the other end to deformable mirror 605. Accordingly, when the length of extendable rod 620 varies, as indicated by two-ended arrows in respective FIGS. 6A and 6B, extendable rod 620 exerts a force against deformable mirror 605.

Retaining ring 610 retains a part of deformable mirror 605 in a fixed position when extendable rod 620 moves. Accordingly, when extendable rod 620 pulls deformable mirror toward rod mount 625, deformable mirror 605 tends to become more concave, as illustrated in the example of FIG. 6B. Retaining ring 610 can be attached to deformable mirror 605 by any of several different mechanisms, such as adhesives, mechanical fasteners, and so on.

Pivot rod 630 serves a dual function of supporting retaining ring 610 and allowing the apparatus to pivot back and forth about the axis of pivot rod 630. Pivot rod 630 can be controlled to pivot under the control of conventional mechanical actuators or by actuators formed of shape memory materials. By moving the apparatus back and forth, pivot rod 630 can control the apparatus to form a flexible oscillating mirror assembly. Such an assembly could be used in any several different applications that use variable focus oscillating mirrors. Examples of such applications include bar code scanning applications.

In some examples, deformable mirror 605 is formed of a flexible membrane type mirror that deforms in response to mechanical forces from extendable rod 620. In other examples, deformable mirror 605 comprises a shape memory material that deforms based on both mechanical forces from deformable rod 620 and a super-elasticity property of the shape memory material. The super-elasticity property of certain shape memory materials is well known and will not be discussed in detail here. However, where deformable mirror 605 is formed of a shape memory material with the super-elasticity property, the property should allow deformable mirror 605 to change states to increase its curvature as shown, e.g., by its modified curvature between FIGS. 6A and 6B.

Extendable rod 620 can be formed of a shape memory material that changes configuration to exert force against deformable mirror 605. Although extendable rod 620 is shown as a relatively simple shaft structure in FIGS. 6A and 6B, it could be modified to have more complex geometries. Some examples of alternative geometries for extendable rod 620 are disclosed in the assignee's related U.S. patent application Ser. No. 11/968,404. Among other things, these alternative geometries include compressible sinusoid shapes, saw-tooth shapes, and so on.

While the example of FIGS. 6A and 6B provides multiple different techniques for manipulating deformable mirror 605—e.g., pivoting, deforming by super-elasticity, deforming by sheer mechanical force, etc.—these techniques can be omitted or modified in other examples. For instance, pivot rod 630 could be omitted and retaining ring 610 could be supported by a different support structure.

FIGS. 7A through 7D illustrate a deformable mirror 700 capable of changing the direction of reflected light in two dimensions based on the mirror's deformation. For convenience of explanation, each of the two-dimension examples has a square shape. However, any of these examples could be modified to have different geometric shapes, such as circles, triangles, arbitrary polygons, etc.

Deformable mirror 700 comprises a shape memory material capable of transitioning between two or more configurations. As with other examples, the reflective portion of deformable mirror 700 could be formed in a variety of different ways, such as by polishing or coating a shape memory metal or by polishing or coating a shape memory ceramic. In some alternative examples, deformable mirror 700 could be formed without using shape memory materials, but controlled by shape memory materials. However, for simplicity and clarity of explanation, it will be assumed that deformable mirror 700 comprises a shape memory material.

FIGS. 7A through 7D show a few possible configurations for deformable mirror 700. In typical operation, deformable mirror 700 transitions between two of these four configurations. For instance, deformable mirror 700 may be designed to transition back-and-forth between the configuration shown in FIG. 7A and one of the respective configurations shown in FIGS. 7B through 7D. These two-dimensional deformations have a variety of applications, including, for example, two dimensional scanning applications such as two-dimensional bar code scanners or two-dimensional imagers.

The configurations of FIGS. 7A through 7D are described in further detail below. In the description that follows, portions of deformable mirror 700 are described as concave or convex. This language should be understood from a viewer's perspective, or from the perspective of incident light. In other words, a particular portion of deformable mirror 700 will be described as a convex portion if light reflects off of the particular portion at a convex surface.

Figure 7A:
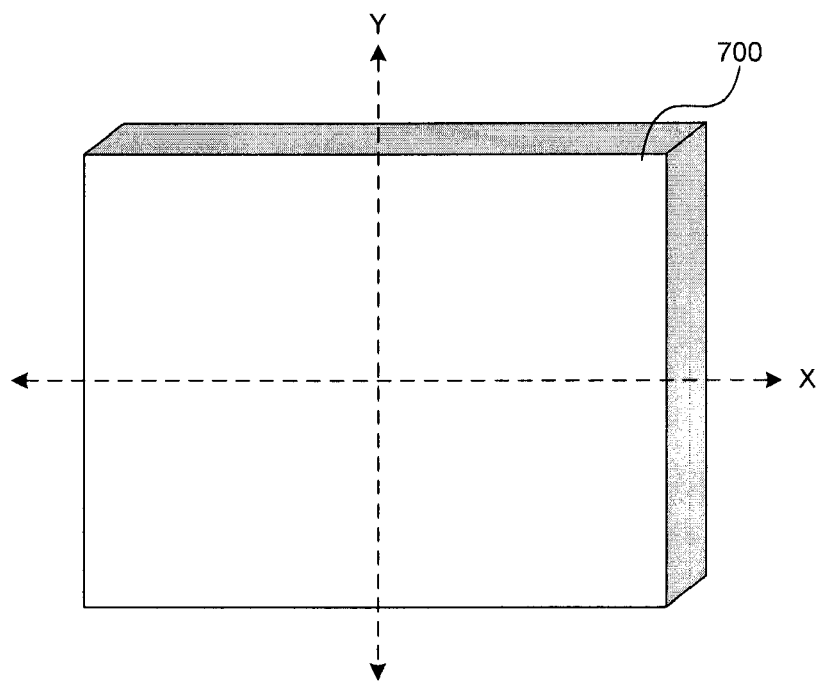
FIGS. 7A through 7D illustrate different configurations of a two-dimensional deformable mirror.
Figure 7B:
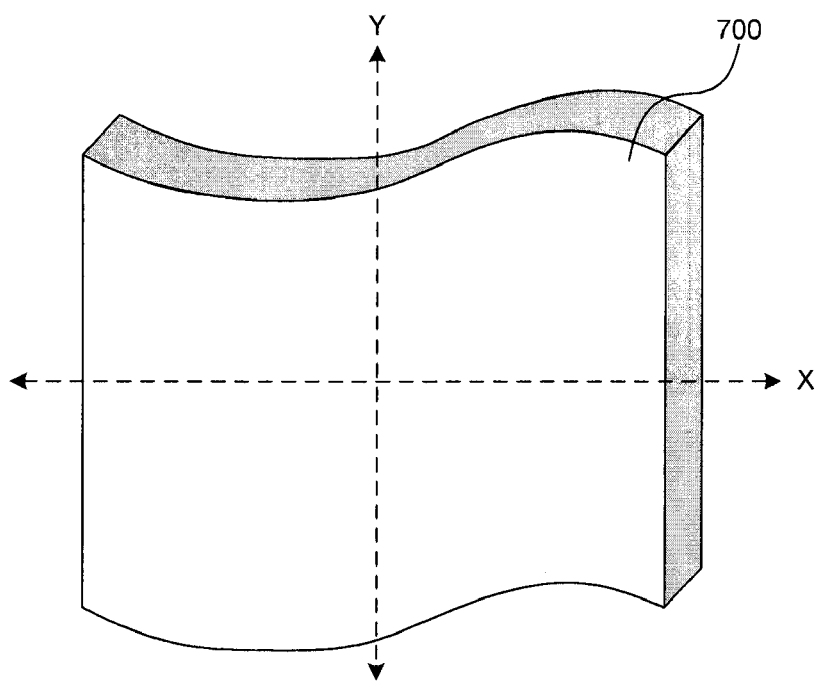
Figure 7C:
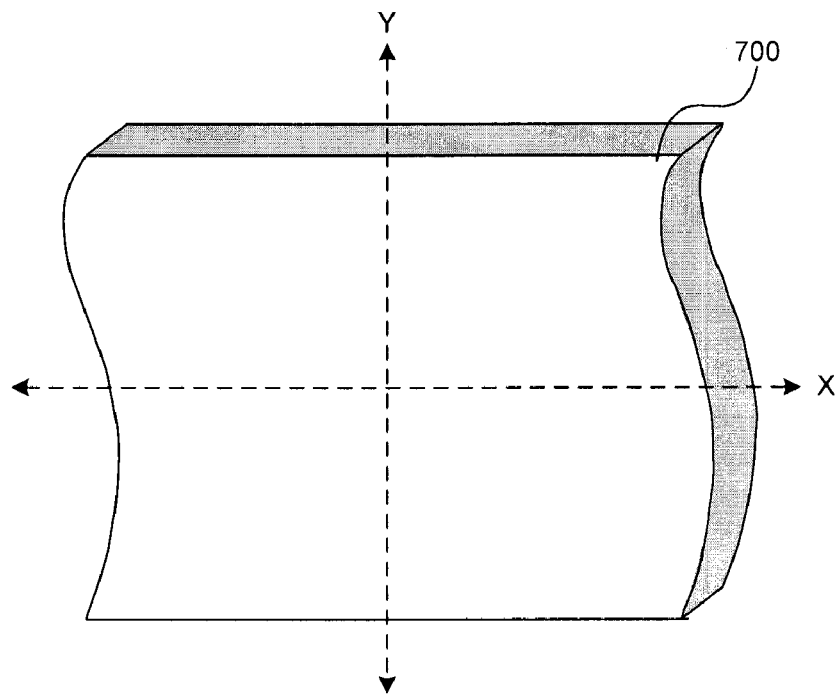
Figure 7D:
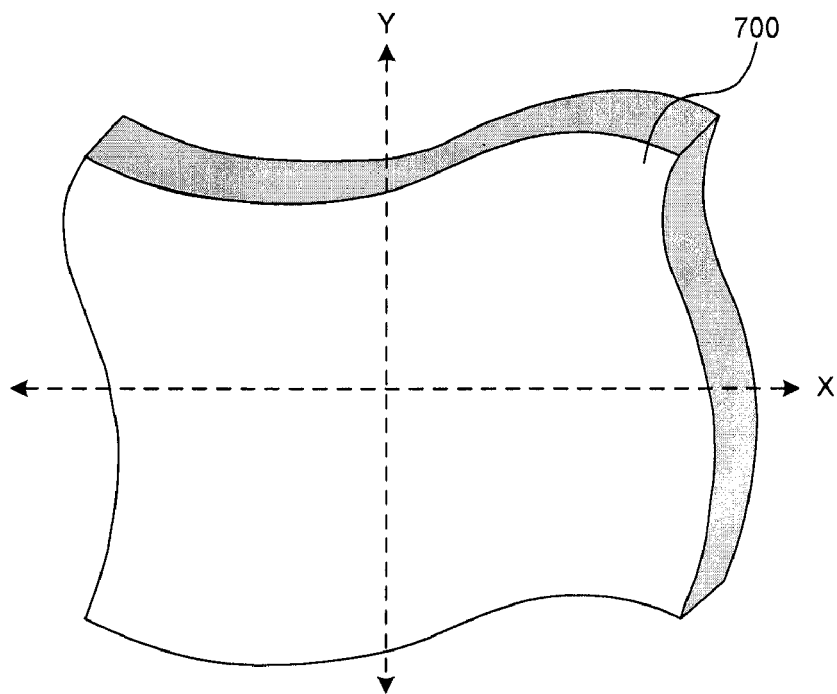

FIG. 7A shows deformable mirror 700 in a flat configuration. FIG. 7B shows deformable mirror 700 in a horizontally undulating (or "wagging" or "waving") configuration with a convex portion on the left side of a y-axis and a concave portion on the right side of the y-axis. FIG. 7C shows deformable mirror 700 in a vertically undulating configuration with a convex portion above an x-axis and a concave portion below the x-axis. FIG. 7D shows deformable mirror 700 in a configuration with alternately undulating convex and concave portions in each of four quadrants. In particular, the deformable mirror 700 of FIG. 7D is convex in a first quadrant above the x-axis and to the left of the y-axis, concave in a second quadrant to the right of the first quadrant, convex in a third quadrant below the second quadrant, and concave in a fourth quadrant to the left of the third quadrant. Additionally, deformable mirror 700 can be designed to deform in other ways not shown in the figures, depending on the particular application in which it is used.

Figure 8B:
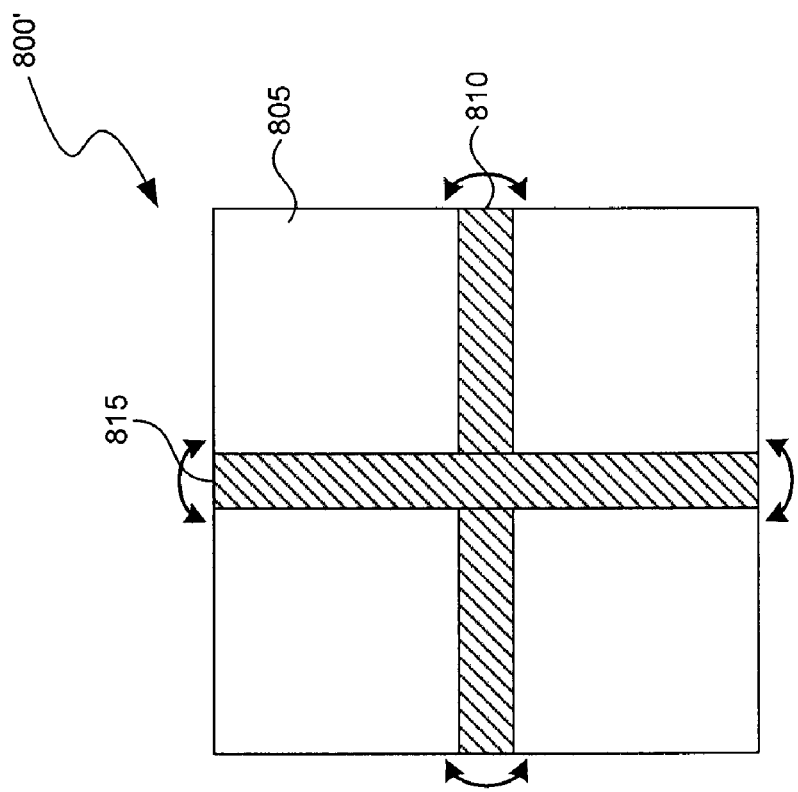
FIGS. 8A and 8B illustrate another type of two-dimensional deformable mirror.
Figure 8A:
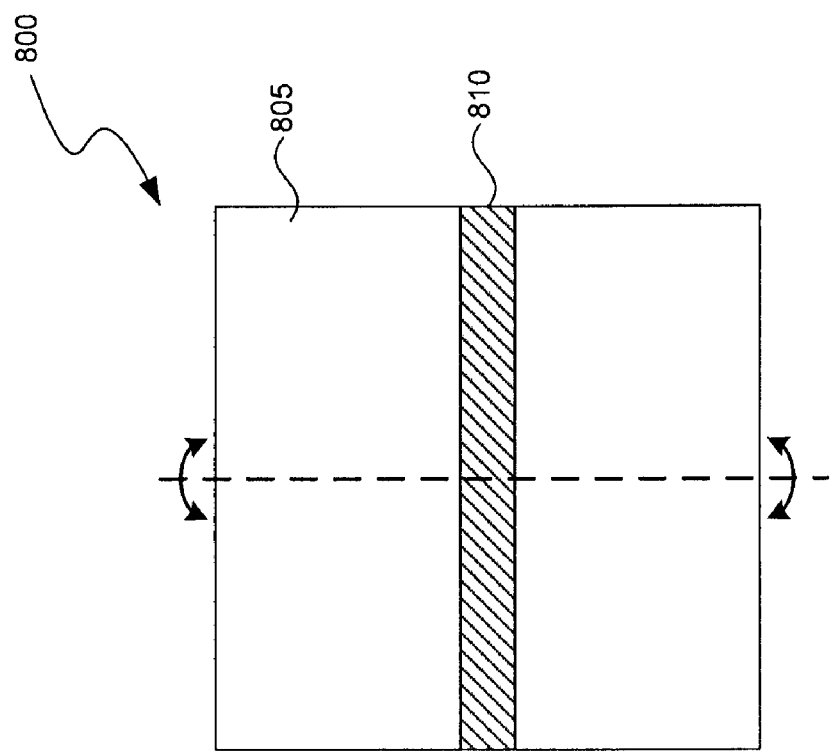

FIGS. 8A and 8B illustrate another type of two-dimensional deformable mirror. Referring to FIG. 8A, a deformable mirror 800 comprises a flexible mirror 805 coupled to a strip 810 of shape memory material. Strip 810 changes configuration to modify the shape of flexible mirror 805 about a y-axis. For example, strip 810 may become curved along its length to flex mirror 805 inward or outward about the y-axis. This type of motion can be used, for example to generate back-and-forth oscillation for a scanner or imager.

In FIG. 8B, deformable mirror 800 is modified (and relabeled as 800') to include an additional strip 815 of shape memory material for modifying the shape of flexible mirror 805 about an x-axis perpendicular to the y-axis. By independently deforming about the x-axis and the y-axis, deformable mirror 800' can provide two-dimensional oscillation for applications such as two-dimensional scanners and imagers. The strips 810 and 815 can be coupled to the mirror and end points, continuously along their lengths, or otherwise.

As an alternative to forming deformable mirrors 800 and 800' from a single flexible mirror panel coupled to one or more strips of shape memory material, these deformable mirrors could be formed of multiple independent mirror panels (flexible or rigid) connected together at the locations of the shaded strips in FIGS. 8A and 8B. In these alternative implementations, the mirror panels could be formed of shape memory materials capable of changing configuration relative to stationary strips, or the mirror panels could be rigid and configured to move in response to movements of deformable strips formed of shape memory materials.

Figure 9:
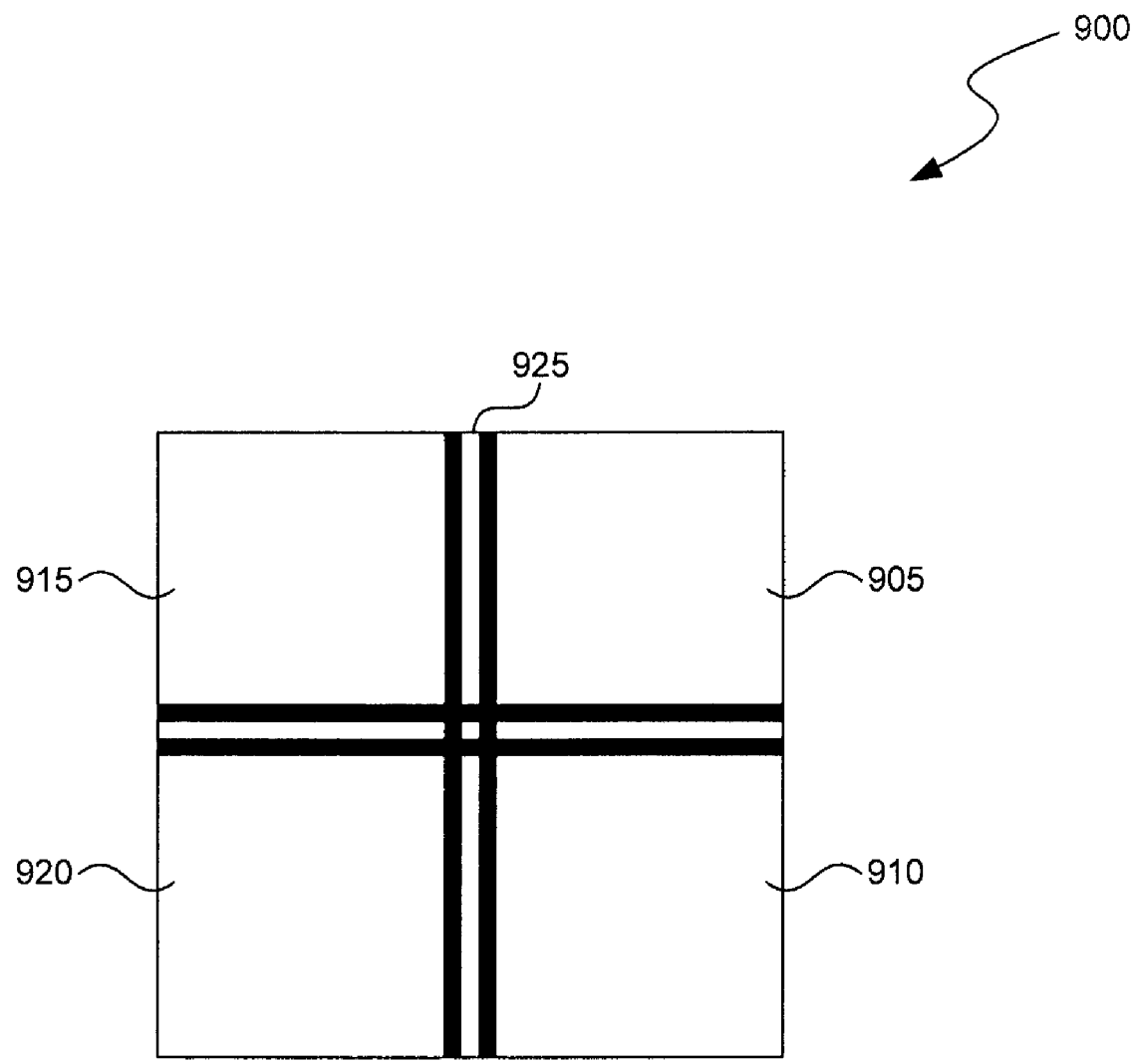
FIG. 9 illustrates a deformable mirror comprising multiple independently deformable sections each capable of changing the direction of reflected light based on the section's deformation.

FIG. 9 illustrates an example deformable mirror 900 comprising multiple sections 905, 910, 915, and 920 separated by a connective pattern 925. As with deformable mirrors 700 and 800, the sections of deformable mirror 900 could each comprise a shape memory material capable of deforming into any of one or more different configurations, or the sections of deformable mirror could be formed of passive components (flexible or rigid) that move in response to deformations of connective pattern 925 (assuming that connective pattern comprises a shape memory material).

The sections of mirror 900 can be formed independent of each other, or they can be formed as a single unit, with connective pattern 925 superimposed on the front or back of the single unit and providing a flexible crease for articulation of the unit. In some implementations of mirror 900 and other deformable mirrors connective portions such as connective pattern 925 and strips 810 and 815 can be formed on the back of the mirrors to minimize the amount of optical distortion produced by the mirrors.

Figure 10A:
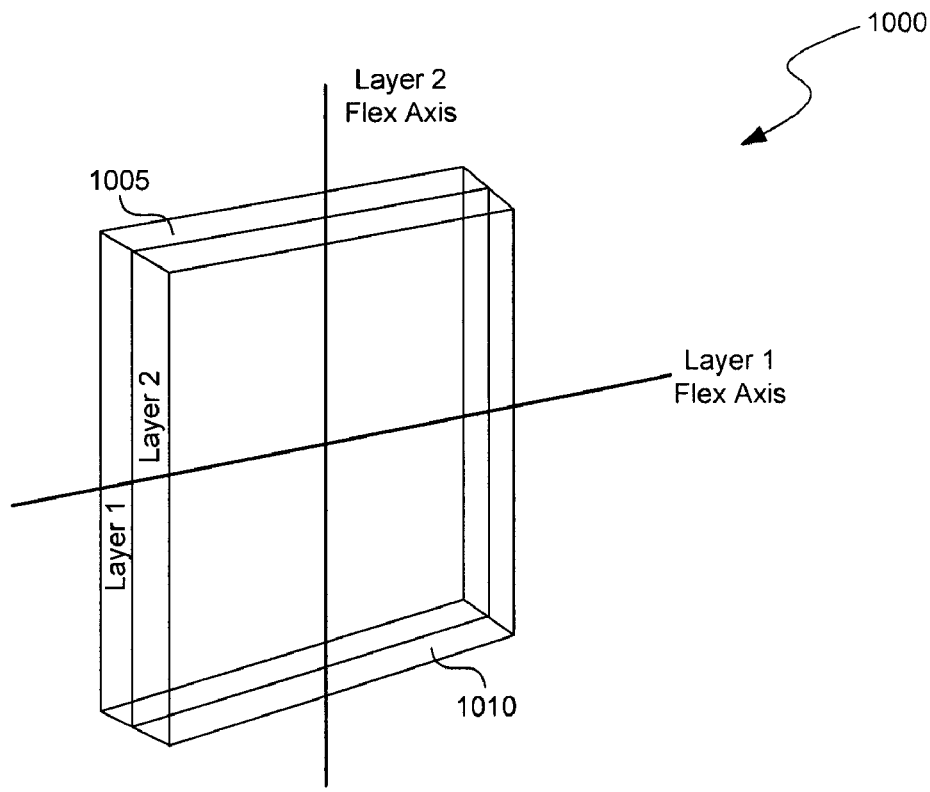
FIGS. 10A and 10B illustrate a deformable mirror comprising two layers of shape memory material each capable of deforming along a different axis to change the direction of reflected light along a different direction.
Figure 10B:
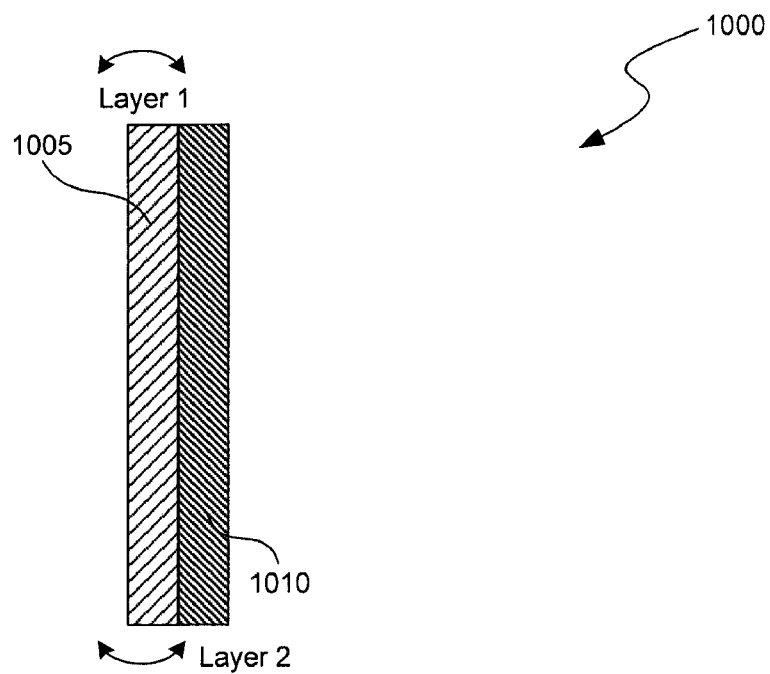

FIGS. 10A and 10B illustrate a deformable mirror 1000 comprising two layers of shape memory material 1005 and 1010 each capable of deforming along a different axis to change the direction of reflected light. In particular, layer 1005 deforms about an x-axis labeled "Layer 1 Flex Axis" and layer 1010 deforms about a y-axis labeled "Layer 2 Flex Axis". Accordingly, mirror 1000 can deflect light in two-dimensions for optical applications such as two-dimensional scanning or imaging.

As explained above, the deformable mirrors presented in this disclosure can be formed directly of shape memory materials or controlled indirectly by shape memory materials. The shape memory materials can be controlled to change configuration using one or more of a variety of simple, accurate, and efficient techniques involving the application of either electrical, thermal, or mechanical energy.

In general, the disclosed techniques and technologies for deforming flexible mirrors tend to be more power efficient and simple to control compared with conventional techniques and technologies. Additionally, the shape memory materials can be manufactured using efficient techniques such as (e.g., in the case of shape memory ceramics) existing or modified semiconductor processing techniques. Moreover, the shape memory materials may be cheaper, faster, and more reliable that conventional mechanical components. Further, the shape memory materials may be combined with other technologies, such as MeMs, to better control deformable mirrors. Individual examples of the invention may provide any of the benefits discussed above, or any of several other benefits not specifically discussed in this disclosure.

Because many of the deformable mirrors can be deformed relatively quickly and accurately in response to electrical control signals, some of these mirrors can be deformed in synchronization with other electrical components in an integrated system. For instance, in a bar code scanner, it may be advantageous to synchronize movements of a deformable mirror with sensing operations of a light sensor. By synchronizing the sensing operations of the light sensor with the movements of a deformable mirror, the scanner may reduce the amount of energy consumed by the light sensor and improve the accuracy of light sensing operations.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, electrical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of examples of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. Further, any specific numbers noted herein are only examples: alternative implementations may employ differing values or ranges.

The teachings of the invention provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as a means-plus-function claim under 35 U.S.C. sec. 112, sixth paragraph, other aspects may likewise be embodied as a means-plus-function claim, or in other forms, such as being embodied in a computer-readable medium. (Any claims intended to be treated under 35 U.S.C. §112, ¶16 will begin with the words "means for".) Accordingly, the inventors reserve the right to add additional claims after filing the application to pursue such additional claim forms for other aspects of the invention.

I claim:

1. An optical device, comprising:
  a deformable mirror having a first stable geometric configuration and a second stable geometric configuration, wherein the deformable mirror is adapted to transition from the first stable geometric configuration to the second stable geometric configuration in response to a deformation of a shape memory material, and
  wherein the shape memory material forms at least a part of the deformable mirror, and the shape memory material is polished to form a reflective surface of the deformable mirror.

2. The optical device of claim 1, wherein the deformable mirror deforms to control a focal length of reflected light.

3. The optical device of claim 1, wherein the deformable mirror deforms to control a direction or a shape of reflected light.

4. The optical device of claim 1, wherein the device further comprises:
  a current source connected in parallel with the deformable mirror and a resistance circuit to control the configuration of the shape memory material.

5. The optical device of claim 1, further comprising:
  an electrical control circuit adapted to output electrical signals to the shape memory material to control the configuration of the deformable mirror; and
  a light sensor adapted to detect light reflected off of a bar code, wherein the light sensor operates in coordination with the electrical control circuit.

6. The optical device of claim 1, wherein the deformable mirror deforms in two different directions to provide two-dimensional scanning capability.

7. The optical device of claim 1, wherein the deformable mirror is suspended in a substrate.

8. The optical device of claim 1, wherein the deformable mirror comprises a flexible reflective surface; and
  wherein the shape memory material further forms at least a part of an extendible rod that becomes longer or shorter in response to deformations of the shape memory material to apply a mechanical force to the deformable mirror.

9. The optical device of claim 1, wherein the deformable mirror comprises a flexible reflective surface and a strip of shape memory material attached to the flexible reflective surface;
  wherein the strip of shape memory material is adapted to deform the deformable mirror by changing the strip's configuration in response to applied energy.

10. The optical device of claim 1, wherein the deformable mirror is adapted to perform an oscillating movement to direct a beam of reflected light for a bar-code scanner.

11. An optical device, comprising:
  a deformable mirror having a first stable geometric configuration and a second stable geometric configuration, wherein the deformable mirror is adapted to transition from the first stable geometric configuration to the second stable geometric configuration in response to a deformation of a shape memory material,
  wherein the deformable mirror comprises a first portion of shape memory material adapted to deform in a first direction and a second portion of shape memory material conformably formed on the first portion of shape memory material and adapted to deform in a second direction substantially perpendicular to the first direction.

12. A method of operating an optical device, comprising:
  controlling a geometric state of a shape memory material by changing the shape memory material from a first stable geometric state to a second stable geometric state; and
  in response to the state change of the shape memory material, changing the shape of a flexible mirror,
  wherein the shape memory material has a superelasticity property and forms at least a part of the flexible mirror; and
  wherein the shape memory material changes state in accordance with the superelasticity property in response to a force applied by an extendable element.

13. The method of claim 12, wherein the shape memory material is coated with a reflective material to form a reflective surface of the flexible mirror.

14. The method of claim 12,
  wherein the shape memory material is polished to form a reflective surface of the flexible mirror.

15. The method of claim 12, wherein the flexible mirror deforms to control a focal length of reflected light.

16. The method of claim 12, wherein the flexible mirror deforms to control a direction or a shape of reflected light.

17. The method of claim 12, wherein the shape memory material further forms at least a part of an extendible member;
  wherein the first stable geometric state corresponds to a contracted state of the extendible member and the second stable geometric state corresponds to an extended state of the extendible member; and
  wherein changing the shape of the flexible mirror comprises increasing a curvature of the flexible mirror when the extendible member changes from the contracted state to the extended state.

18. A device adapted to manipulate light, comprising:
  means for controlling a geometric state of a shape memory material by changing the shape memory material from a first stable geometric state to a second stable geometric state; and means for changing the shape of a deformable mirror in response to the state change of the shape memory material, wherein the shape memory material has a superelasticity property and forms at least a part of the deformable mirror; and wherein the shape memory material changes state in accordance with the superelasticity property in response to a force applied by an extendable element.

19. The device of claim 18, wherein the shape memory material is coated with a reflective material to form a reflective surface of the deformable mirror.

20. The device of claim 18,
wherein the shape memory material is polished to form a reflective surface of the deformable mirror.

21. The device of claim 18, wherein the deformable mirror deforms to control a focal length of reflected light.

22. The device of claim 18, wherein the deformable mirror deforms to control a direction or a shape of reflected light.

23. The device of claim 18, wherein the shape memory material further forms at least a part of an extension means;
wherein the first stable geometric state corresponds to a contracted state of the extension means and the second stable geometric state corresponds to an extended state of the extension means; and
wherein changing the shape of the deformable mirror comprises increasing a curvature of the deformable mirror when the extension means changes from the contracted state to the extended state.

* * * * *